United States Patent
Wang et al.

(10) Patent No.: US 7,683,686 B2
(45) Date of Patent: Mar. 23, 2010

(54) POWER-ON CIRCUIT FOR COMPUTER

(75) Inventors: Ning Wang, Shenzhen (CN); Yong-Xing You, Shenzhen (CN)

(73) Assignees: Hong Fu Jin Precision Industry (ShenZhen) Co., Ltd., Shenzhen, Guangdong Province (CN); Hon Hai Precision Industry Co., Ltd., Tu-Cheng, Taipei Hsien (TW)

( * ) Notice: Subject to any disclaimer, the term of this patent is extended or adjusted under 35 U.S.C. 154(b) by 41 days.

(21) Appl. No.: 12/189,103

(22) Filed: Aug. 8, 2008

(65) Prior Publication Data

US 2009/0290300 A1    Nov. 26, 2009

(30) Foreign Application Priority Data

May 23, 2008    (CN) .................... 2008 1 0301741

(51) Int. Cl.
*G06F 1/00* (2006.01)
(52) U.S. Cl. ................. 327/198; 327/142; 713/300; 361/679.46; 361/718; 361/719; 361/722
(58) Field of Classification Search .......... 327/142, 327/143, 198; 713/300, 310; 361/679.46, 361/679.54, 688, 709, 717–720, 722
See application file for complete search history.

(56) References Cited

U.S. PATENT DOCUMENTS 6,534,995 B1 *  3/2003  Schell et al. ................ 324/511

* cited by examiner

*Primary Examiner*—Lincoln Donovan
*Assistant Examiner*—Patrick O'Neill
(74) *Attorney, Agent, or Firm*—Zhigang Ma

(57) ABSTRACT

A power-on circuit of a computer includes a heat sink, an SIO chip, a connector, a first electric switch, a second electric switch, and a third electric switch. When the heat sink is installed properly, the heat sink is grounded, and the first electric switch is turned off. After a power-on button is pressed down, a power supply on pin of the SIO chip sends a low level signal to turn off the second electric switch, the third electric switch is turned on, a power supply on pin of the connector is at a low level, and the computer is powered on. When the heat sink is installed improperly, the heat sink is not grounded, the first electric switch is turned on, the third electric switch is turned off, the power supply on pin of the connector is at a high level, and the computer cannot be powered on.

6 Claims, 1 Drawing Sheet

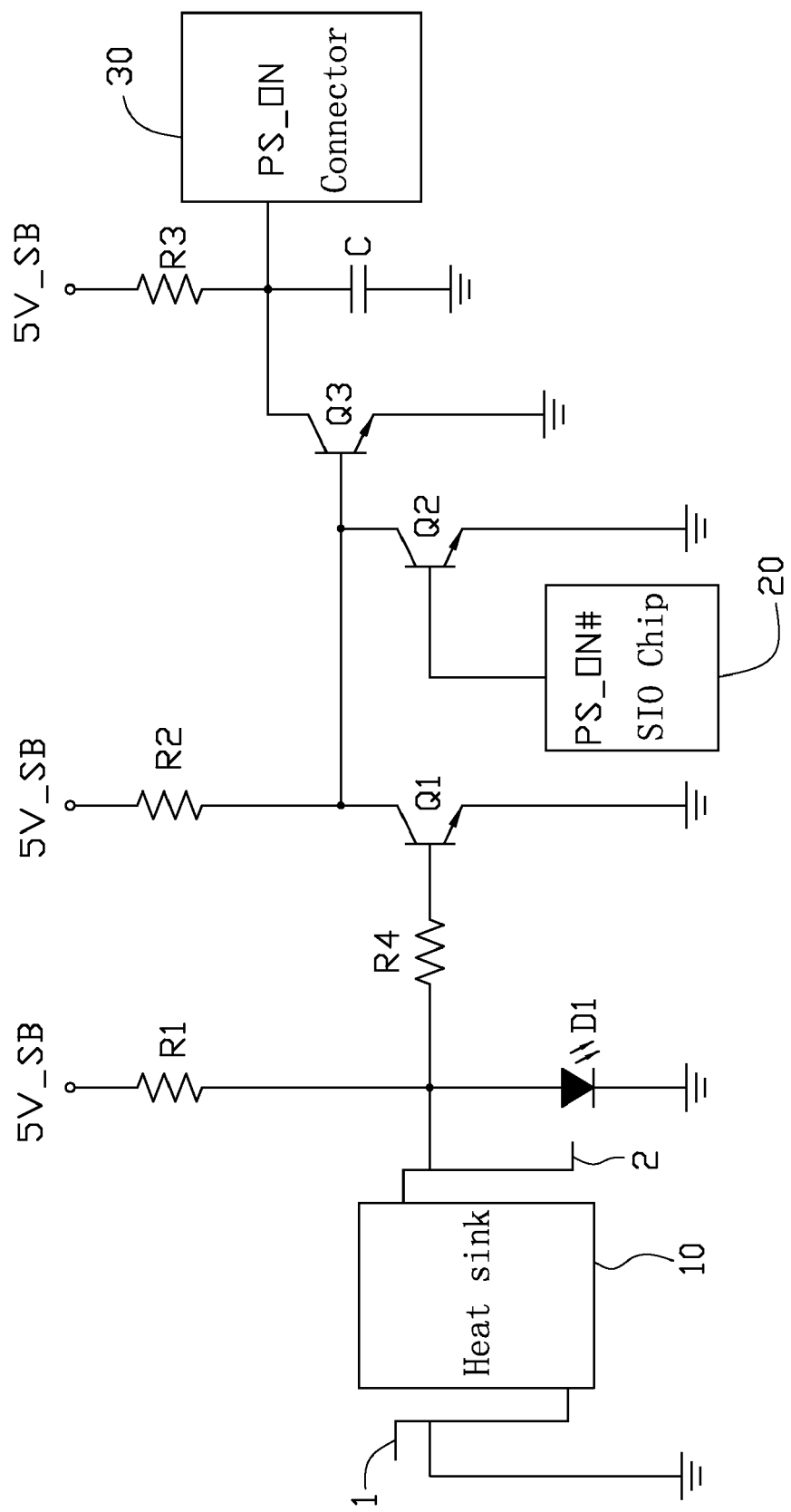

POWER-ON CIRCUIT FOR COMPUTER

BACKGROUND

1. Field of the Invention

The present invention relates to a power-on circuit for a computer.

2. Description of Related Art

Advances in microelectronics technology have resulted in electronic devices which process signals and data at unprecedented high speeds. During operations of many contemporary electronic devices, such as central processing units (CPUs), large amounts of heat are produced, which must be dissipated quickly to prevent overheating damage. Heat sinks are frequently used to dissipate heat from these electronic devices.

Generally speaking, a heat sink is fixed on an electronic device mounted on a motherboard by two hooks of a clip, to dissipate heat from the electronic device. Both hooks of the clip are grounded. However, when assembling the electronic device or cleaning the motherboard, users may either forget to install the heat sink or install the heat sink improperly, which may lead to overheating damage.

What is desired, therefore, is to provide a power-on circuit for a computer which can power on the computer according to an installation state of a heat sink.

BRIEF DESCRIPTION OF THE DRAWING

The drawing is a circuit diagram of a power-on circuit of a computer in accordance with an embodiment of the present invention.

DETAILED DESCRIPTION

Referring to the drawing, a power-on circuit of a computer in accordance with an embodiment of the present invention includes a heat sink 10, a super input/output (SIO) chip 20, a connector 30, three transistors Q1-Q3, four resistors R1-R4, a light emitting diode (LED) D1, and a capacitor C. The heat sink 10 is installed on an electronic device mounted on a motherboard (not shown) by two hooks 1 and 2 of a clip (not shown), to dissipate heat from the electronic device. The SIO chip 20 includes a power supply on pin PS_ON#. The connector 30 includes a power supply on pin PS_ON and is configured for connecting to an advanced technology extended (ATX) power supply. The three transistors Q1-Q3 are NPN transistors functioning as three electric switches.

A 5V standby power supply 5V_SB of the motherboard is grounded via the resistor R1 and the LED D1 in sequence. The base of the transistor Q1 is connected to a node between the resistor R1 and the anode of the LED D1 via the resistor R4. The collector of the transistor Q1 is connected to the 5V standby power supply 5V_SB via the resistor R2. The base of the transistor Q2 is connected to the pin PS_ON# of the SIO chip 20. The collector of the transistor Q2 is connected to the collector of the transistor Q1. The base of the transistor Q3 is connected to the collector of the transistor Q1. The collector of the transistor Q3 is connected to the pin PS_ON of the connector 30, the 5V standby power supply 5V_SB via the resistor R3, and grounded via the capacitor C. All emitters of the transistors Q1-Q3 are grounded.

When the heat sink 10 is installed on the electronic device mounted on the motherboard properly, the hook 1 of the clip is grounded, and the hook 2 of the clip is connected to the base of the transistor Q1. Both the heat sink 10 and the clip are conductors, therefore, when the hook 1 is grounded, the hook 2 is grounded too, and the LED D1 and the transistor Q1 are turned off. When the computer is provided with power, but the power-on button is not pressed down, the transistor Q2 is turned on since voltage at the pin PS_ON# of the SIO chip 20 is at high level, the transistor Q3 is turned off since voltage at the collector of the transistor Q2 is at a low level, voltage at the pin PS_ON of the connector 30 is at a high level, and power from the ATX power supply cannot reach the motherboard, and the computer can not be powered on. When the power-on button is pressed down, the transistor Q2 is turned off since voltage at the pin PS_ON# of the SIO chip 20 drops to a low level, the transistor Q3 is turned on since the collector of the transistor Q2 goes to a high level, voltage at the pin PS_ON of the connector 30 is at low level, the ATX power supply powers the motherboard, so that the computer is powered on. As a result, when the heat sink 10 is installed properly, the computer can boot normally.

When the heat sink 10 is not installed, or installed improperly, for example one or both of the hooks 1,2 are not connected properly, the anode of the LED D1 and the base of the transistor Q1 will both be at high level, so that the LED D1 and the transistor Q1 are turned on. The LED D1 indicates to users that there is a problem with installation of the heat sink 10. The transistor Q3 is turned off since voltage at the collector of the transistor Q1 is at a low level. In this situation, no matter whether the power-on button is pressed down or not, and whether the transistor Q2 is turned on or not, the transistor Q3 will remain off. Therefore, the pin PS-ON of the connector 30 maintains high level, and the ATX power supply cannot supply power to the motherboard, so that the computer cannot be powered on.

It is to be understood, however, that even though numerous characteristics and advantages of the present invention have been set forth in the foregoing description, together with details of the structure and function of the invention, the disclosure is illustrative only, and changes may be made in details, especially in matters of shape, size, and arrangement of parts within the principles of the invention to the full extent indicated by the broad general meaning of the terms in which the appended claims are expressed.

What is claimed is:

1. A power-on circuit for a computer comprising:
   a heat sink installed on an electronic device mounted on a motherboard by a clip;
   a super input/output (SIO) chip comprising a power supply on pin;
   a connector configured for coupling to an advanced technology extended power supply, the connector comprising a power supply on pin;
   a first electric switch comprising a first terminal connected to the heat sink and a power supply via a first resistor, a second terminal connected to the power supply via a second resistor, and a grounded third terminal;
   a second electric switch comprising a first terminal connected to the power supply on pin of the SIO chip, a second terminal connected to the second terminal of the first electric switch, and a grounded third terminal; and
   a third electric switch comprising a first terminal connected to the second terminal of the first electric switch, a second terminal connected to the power supply on pin of the connector, and connected to the power supply via a third resistor, and a grounded third terminal;
   wherein upon a condition that the heat sink is installed on the motherboard of the computer properly, the heat sink is grounded, the first electric switch is turned off; after a power-on button is pressed down, the power supply on pin of the SIO chip sends a low level signal to turn off the second electric switch, the third electric switch is turned on, the power supply on pin of the connector is at a low level, the computer is powered on; and upon a condition that the heat sink is installed on the motherboard of the computer improperly, so that the heat sink is not grounded, the first electric switch is turned on, the third electric switch is turned off, the power supply on pin of the connector is at a high level, the computer cannot be powered on.

2. The power-on circuit as claimed in claim 1, wherein the clip comprises two hooks; upon a condition that the heat sink is installed properly, one hook of the clip is connected to the first terminal of the first electric switch, and the other hook of the clip is grounded.

3. The power-on circuit as claimed in claim 1, wherein the first terminal of the first electric switch is grounded via a fourth resistor and a light emitting diode in sequence.

4. The power-on circuit as claimed in claim 1, wherein the second terminal of the third electric switch is grounded via a capacitor.

5. The power-on circuit as claimed in claim 1, wherein the first, the second and the third electric switches are NPN transistors, and the first, second, and third terminals of each switch are base, collector, and emitter respectively.

6. The power-on circuit as claimed in claim 1, wherein the power supply is a 5V standby power supply.

* * * * *